United States Patent
Pieczul et al.

(10) Patent No.: US 10,372,899 B2
(45) Date of Patent: *Aug. 6, 2019

(54) METHOD AND APPARATUS FOR CONTEXT-AWARE OUTPUT ESCAPING USING DYNAMIC CONTENT MARKING

(75) Inventors: Olgierd Pieczul, Dublin (IE); Mark Alexander McGloin, Dublin (IE); Mary Ellen Zurko, Groton, MA (US)

(73) Assignee: International Business Machines Corporation, Armonk, NY (US)

(*) Notice: Subject to any disclaimer, the term of this patent is extended or adjusted under 35 U.S.C. 154(b) by 173 days.

This patent is subject to a terminal disclaimer.

(21) Appl. No.: 12/841,747

(22) Filed: Jul. 22, 2010

(65) Prior Publication Data
US 2012/0023394 A1 Jan. 26, 2012

(51) Int. Cl.
*G06F 17/00* (2006.01)
*G06F 21/50* (2013.01)
(Continued)

(52) U.S. Cl.
CPC ............... *G06F 21/50* (2013.01); *G06F 21/51* (2013.01); *G06F 21/54* (2013.01); *G06F 21/56* (2013.01); *G06F 2221/2119* (2013.01)

(58) Field of Classification Search
CPC .............................................. G06F 2221/2119
(Continued)

(56) References Cited

U.S. PATENT DOCUMENTS 6,605,120 B1 8/2003 Fields et al.
6,606,525 B1 8/2003 Muthuswamy et al.
(Continued)

FOREIGN PATENT DOCUMENTS

CN 101356535 A1 1/2009
CN 101686130 A1 3/2010
(Continued)

OTHER PUBLICATIONS

EUROSEC GmbH Chiffriertechnik & Sicherheit, "Filtering JavaScript to Prevent Cross-Site Scripting; secologic Project", 2005, pp. 1-23.*
(Continued)

*Primary Examiner* — Shawn S Joseph
(74) *Attorney, Agent, or Firm* — David B. Woycechowsky; Jeffrey S. LaBaw; David H. Judson

(57) ABSTRACT

A technique to provide runtime output sanitization filtering of web application content that contains multiple contexts in which dynamic output is included. To facilitate this operation, dynamically-generated content is prepared for sanitization in advance, preferably by being "marked" by the web application itself (or by middleware). Preferably, given dynamically-generated content is marked by enclosing it between dynamic content indicators. After the document generation is completed but before it is output, the application-generated content is processed by a content sanitization filter. The filter uses the dynamic content identifiers to identify and locate the content that needs output escaping. The filter detects the appropriate context within which the dynamically-generated content has been placed and applies escaping. The output content is prepared for escaping in advance even if assembled from multiple sources that do not operate in the same runtime environment.

12 Claims, 4 Drawing Sheets

(51) Int. Cl.
*G06F 21/51* (2013.01)
*G06F 21/54* (2013.01)
*G06F 21/56* (2013.01)

(58) Field of Classification Search
USPC .......................................................... 715/234
See application file for complete search history.

(56) References Cited

U.S. PATENT DOCUMENTS

| | | | |
|---|---|---|---|
| 6,880,083 B1 | 4/2005 | Korn | |
| 7,437,660 B1* | 10/2008 | Mehta et al. | 715/205 |
| 7,487,660 B2 | 2/2009 | Schumann | |
| 8,914,774 B1* | 12/2014 | Colton | G06F 9/44578 709/203 |
| 2003/0014443 A1 | 1/2003 | Bernstein et al. | |
| 2003/0208600 A1* | 11/2003 | Cousins | H04L 29/06 709/227 |
| 2004/0187077 A1 | 9/2004 | Bhogal et al. | |
| 2005/0198692 A1* | 9/2005 | Zurko | G06F 21/563 726/24 |
| 2007/0107057 A1* | 5/2007 | Chander | G06F 21/54 726/22 |
| 2009/0055443 A1* | 2/2009 | Miyamoto et al. | 707/202 |
| 2009/0210441 A1 | 8/2009 | Mercer et al. | |
| 2009/0292983 A1* | 11/2009 | Anand | G06F 21/52 715/234 |
| 2010/0031160 A1 | 2/2010 | Boyer et al. | |
| 2011/0252475 A1* | 10/2011 | Mui | G06F 21/56 726/23 |
| 2012/0079368 A1* | 3/2012 | Abdelaziz et al. | 715/234 |

FOREIGN PATENT DOCUMENTS

| | | |
|---|---|---|
| CN | 101741645 A1 | 6/2010 |
| WO | WO2009/115019 | 9/2009 |

OTHER PUBLICATIONS

JavaScript: The Definitive Guide By David Flannagan; ISBN: 1-56592-235-2, 637 pages. Second Edition, Jan. 1997.*

Cross-Site Scripting Prevention with Dynamic Data Tainting and Static Analysis Philipp Vogt, Florian Nentwich, Nenad Jovanovic, Engin Kirda, Christopher Kruegel, and Giovanni Vigna Secure Systems Lab Technical University Vienna.*

Detecting Security Vulnerabilities in Web Applications Using Dynamic Analysis with Penetration Testing Andrey Petukhov, Dmitry Kozlov Computing Systems Lab, Department of Computer Science, Moscow State University.*

Beyond XSS—Towards Universal Content Filtering Sachiko Yoshihama, Ai Ishida, Naohiko Uramoto IBM Research, Tokyo Research Laboratory.*

International Search Report, PCT/EP2011/061061, dated Nov. 9, 2011.

Johns et al, "XSSDS: Server-side Detection of Cross-site Scripting Attacks," 2008 Annual Computer Security Applications Conference.

Bisht et al, "XSS-GUARD: Precise Dynamic Prevention of Cross-Site Scripting Attack," University of Chicago, Jul. 10, 2008.

XSS-GUARD: Precise Dynamic Prevention of Cross-Site Scripting Attack, Jul. 10, 2008.

Xie, et al, "Static Detection of Cross-Site Scripting Vulnerabilities," Stanford University, May 10, 2008.

Tramontana et al, "Identifying cross site scripting vulnerabilities in Web applications," Sep. 11, 2004.

Nadji et al, "Document Structure Integrity: A Robust Basis for Cross-site Scripting Defense." Proceedings of the 16th Annual Network & Distributed System Security Symposium (NDSS Symposium 2009), Feb. 2009.

Office action, dated Feb. 8, 2016, German Patent Office.

Wassermann et al, "Static detection of cross-site scripting vulnerabilities," Software Engineering, 2008.

Di Lucca et al, "Identifying cross-site scripting vulnerabilities in Web applications," Sep. 2004.

Shanmugan, et al, "Risk mitigation for cross site scripting attacks using signature-based model on the server side," Computer and Computational Sciences, Aug. 2007.

Ollmann, "HTML Code Injection and Effect of CSS (XSS) Vulnerabilities," Jan. 2003.

* cited by examiner

```
<body>
    <script>legitimate_operation();</script>             702   702
    <div>Your user name is: <script>hack();</script></div>
<body>
```

000
METHOD AND APPARATUS FOR CONTEXT-AWARE OUTPUT ESCAPING USING DYNAMIC CONTENT MARKING

CROSS-REFERENCE TO RELATED APPLICATION

This application is related to Ser. No. 12/841,814, filed Jul. 22, 2010, titled "Method and apparatus for dynamic content marking to facilitate context-aware output escaping."

COPYRIGHT STATEMENT

A portion of the disclosure of this patent document contains material that is subject to copyright protection. The copyright owner has no objection to the facsimile reproduction of the patent document as it appears in the Patent & Trademark Office file or records, but it otherwise reserves all copyright rights.

BACKGROUND OF THE INVENTION

1. Technical Field

This disclosure relates generally to web application security and in particular to a method and system for providing runtime content sanitization.

2. Background of the Related Art

Ensuring that modern software systems are free of security vulnerabilities is a daunting task. Such systems often comprise large amounts of code, including third party and remote components. Moreover, the measures that need to be taken to prevent potential attacks, in most cases, are far from straightforward, as they depend on the state of the application, the exact content of the (potentially malicious) data being processed, and the use(s) the application is about to make of that data. The problem is aggravated when it comes to web applications, which by design often feed on untrusted data in the form of user input. Also, web applications often make access to security-sensitive resources, such as databases, file systems or sockets. The problem of securing web applications against malicious attacks therefore has received significant attention.

Cross-Site Scripting (XSS) is a web application vulnerability that allows malicious users to inject code into pages that are viewed by other users. In many classifications, it is recognized as a top web application vulnerability class. The most severe consequences of XSS issues are that attacker is able to make a legitimate user's browser perform operations that change application state on behalf of that user, or that make a user's browser disclose private data.

There are several known methods to protect against an XSS attack. One approach is referred to as input filtering. This approach involves checking web application input for malicious data and rejecting or filtering it as needed. The input filtering method, however, cannot guarantee full protection, and it may be overly aggressive (to the point of being useless) if input data is used by web application in multiple contexts (e.g. HTML and JavaScript). An alternative approach is to use client-side protection, whereby users equip their browsers with extensions that automatically detect attack attempts. The client-side approach, however, does not work properly with some types of XSS attacks, especially persistent XSS where injected code is not passed through input parameters.

Yet another approach, and one which is the best known solution, is referred to output escaping. XSS attacks happen when the application fails to escape its output and an attacker puts HTML and/or JavaScript on the site, which code then runs in the site visitor's web browser. Output escaping stops this happening by making sure that the application never sends commands (HTML) when it only intends to send plaintext. In particular, in this approach, the guarding against XSS attacks is done by escaping characters, i.e., representing characters such that they are treated as data rather than metadata to be consumed by an interpreter's parser. Escape rules for XSS are sensitive to HTML context in which the (often untrusted) input is to be embedded, and these rules typically distinguish among the various components of the page (viz., HTML body, typical attributes, JavaScript event handlers, and links). This approach is designed to ensure that content rendered by the application contains a code (even if the code is input). To be implemented successfully, however, this solution requires significant attention from developers and an active approach from test teams, and it is difficult to implement if the application is a composite created with software from different vendors. Output escaping mechanisms also are difficult to maintain and automate.

An additional problem that output escaping introduces occurs when dynamic content is included by the web application in multiple different contexts (e.g., using HTML, JavaScript, etc.) in a single document. Each inclusion context typically requires different sanitization using a distinct escaping method, and these different escaping methods are often incompatible and cannot be used together. Solving this problem poses additional issues. If sanitization is performed at the moment of including the dynamic content into the resulting document, it may be difficult to identify an outer context (of the included portion) and what escaping should be used for the output. A part of the code that renders the particular dynamic content may not be aware in which content it would be executed. If, however, escaping is not performed during dynamic content inclusion but rather delayed until the application constructs the complete document, it is easy to identify the context of every element, however, at this point the application is not able to distinguish which parts of the document are legitimate and which are XSS injected.

The techniques disclosed herein address these and other deficiencies of the known prior art.

BRIEF SUMMARY OF THE INVENTION

Generally, this disclosure provides runtime output sanitization filtering of web application content that contains multiple contexts in which dynamic output is included. To facilitate this operation, dynamically-generated content is prepared for sanitization in advance, preferably by being "marked" by the web application itself (or by middleware used by or associated with the application). Preferably, given dynamically-generated content is marked by enclosing it between dynamic content indicators. The marking is generated in such a way that it does not collide with legitimate application content and also to protect against intended collisions that attackers can try to use to bypass escaping. Then, after the document generation is completed but before it is output (delivered), the application-generated content is processed by a content sanitization filter. The filter uses the dynamic content identifiers to identify and locate the content that needs output escaping. The filter detects the appropriate context within which the dynamically-generated content has been placed, and it then applies the appropriate escaping. In this manner, the output content is fully prepared for escaping in advance even if it is being assembled from multiple input sources that do not operate in the same runtime environment. In this approach, escaping is added after all other application processing is finished and the complete document is ready for delivery to the requesting end user.

In a representative embodiment, a method for protecting against cross-site scripting attack implements a sanitization filter. The filter receives a markup language document that has been generated in response to a web application request. The markup language document comprises one or more dynamically-generated outputs each being marked to identify the dynamically-generated output, together with at least one static content portion. Prior to outputting the markup language document in response to the web application request, the filter processes the document to sanitize the one or more dynamically-generated outputs. The document as processed is then served to complete the web application request.

In another representative embodiment, a method for protecting against cross-site scripting attack is initiated after a web application has generated a complete markup language document (e.g., as document that has all dynamically-generated includes processed) in response to a web application request. The complete markup language document comprises static content, and one or more dynamic outputs. According to the method, each of the one or more dynamic outputs in the complete markup language document is marked, preferably with dynamic content indicators or markers. Prior to outputting the complete markup language document in response to the web application request, each of the marked dynamic outputs is then sanitized to add output escaping. The document as processed is then served to complete the request.

In another representative embodiment, an apparatus includes a processor, and computer program memory holding computer program instructions executed by the processor to carry out the marking and/or filtering method.

In yet another embodiment, a computer product in a computer readable medium for use in a data processing system for protecting against cross-site scripting attack is described. The computer program product holds computer program instructions which, when executed by the data processing system, perform the marking and/or filtering method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN
ILLUSTRATIVE EMBODIMENT

Figure 1:
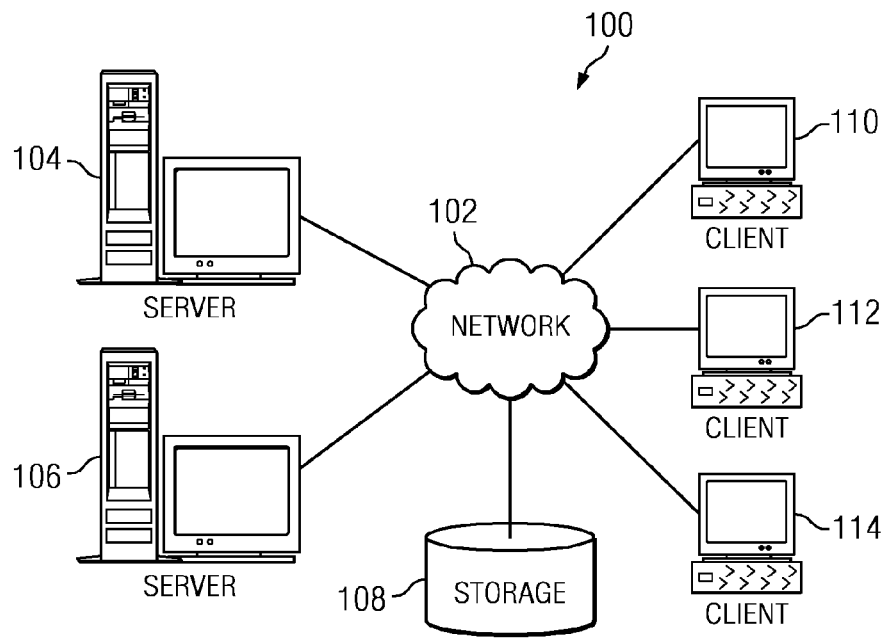
FIG. 1 depicts an exemplary block diagram of a distributed data processing environment in which exemplary aspects of the illustrative embodiments may be implemented.
Figure 2:
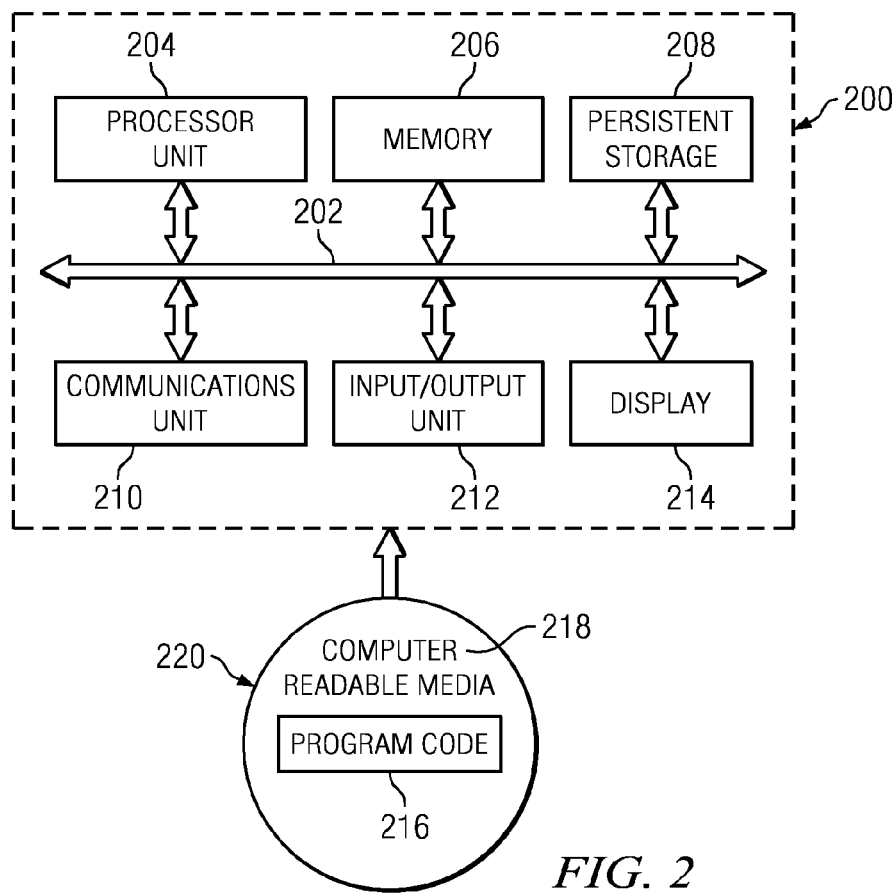
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

Figure 3:
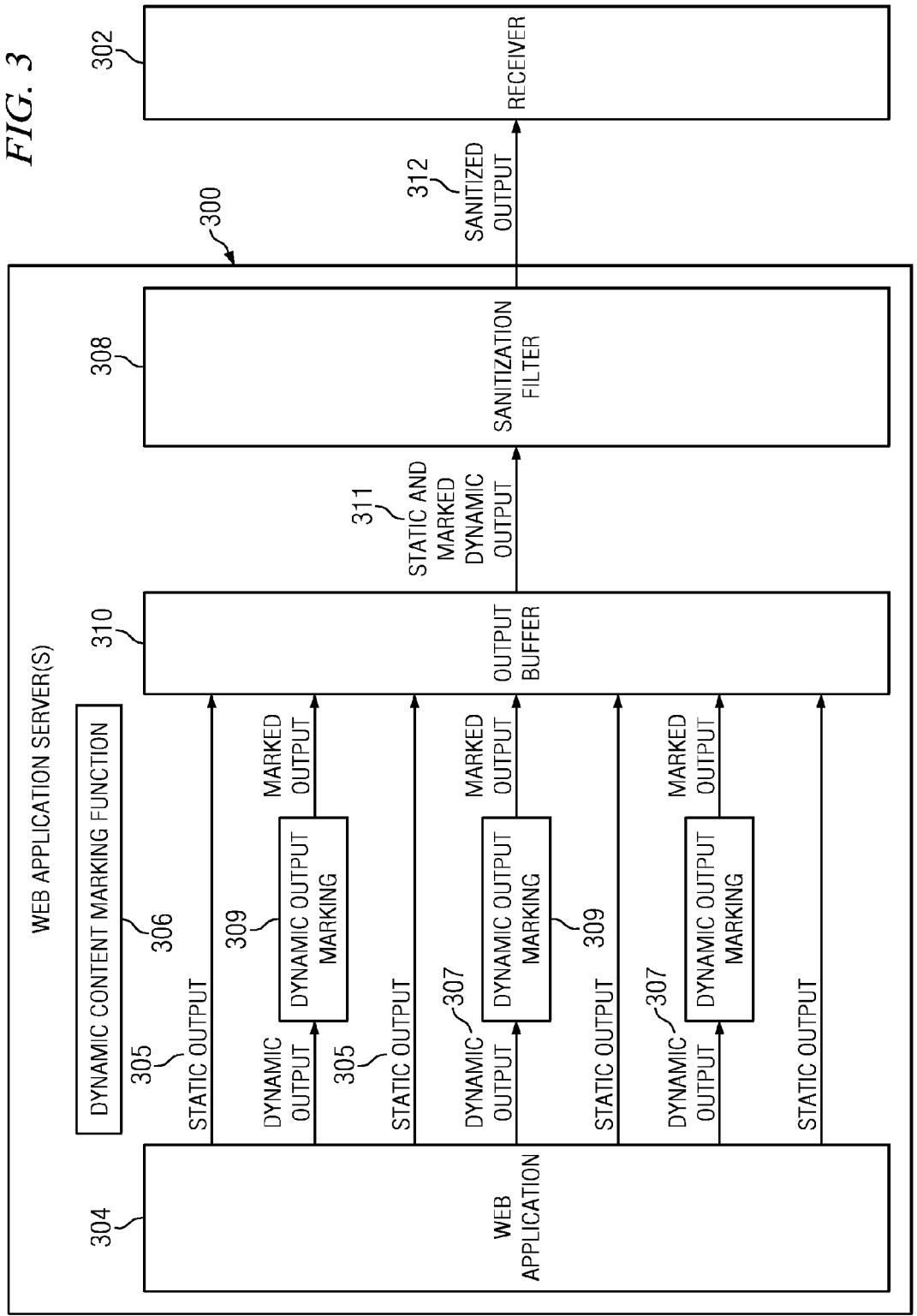
FIG. 3 is a block diagram of a set of components that provide a system for automated dynamic content marking and output sanitization according to the teachings of this disclosure.

FIG. 3 illustrates the high level components of a system that implements automated processing of a web application 304 to provide the dynamic content marking and output sanitization according to this disclosure. As shown in FIG. 3, the web application 304 is executing on a web application server or servers 300 in a known manner. A receiver 302 is a client machine that has made a request to the web application server 300 and that is being handled by the web application 304. Typically, a web browser (or other rendering engine) executes on the client (receiver 302). Thus, the receiver 302 and server 304 correspond generally to the "client" and "server" illustrated in FIG. 1. As used herein, the phrase "web application" should be broadly construed to include server-side processes, components and/or functions that generate markup language documents, such as HTML. Web applications typically include, without limitation, an HTTP daemon (namely, a web server), a J2EE servlet, a PHP or equivalent script, an application server, or the like. While the page output from the web application 304 typically is a markup language page such as HTML, this is not a limitation, as the techniques described herein may be implemented with an output that is of any markup language format (e.g., XML, HDML, WML, and the like). As is well-known, typically an HTML document is output from the web application 304 in an HTTP request-response exchange as a data stream. The term "browser" likewise should be broadly construed to cover an HTTP browser, plug-in, or other client-side code for outputting (e.g., rendering) markup language or equivalent data.

The system comprises a pair of processes illustrated in FIG. 3 by dynamic content marking function 306, and sanitization filter 308. As will be explained, process 306 and process 308 preferably are "linked" logically, but they need not be physically linked or even operate within the same runtime environment. Thus, these processes are illustrated in FIG. 3 as executing within the web application server 300 but this illustration is merely for convenience; a technical advantage of the disclosed technique is the decoupling of these operations, as is now described in more detail.

The dynamic content marking function 306 operates to provide dynamic output markings 309 to each of the dynamically-generated outputs 307 being generated by the web application 304. As is known in the prior art, each of the dynamically-generated outputs 307 may have its own associated (and unique) context (e.g., HTML, JavaScript, and others) that differs from a context of one or more other dynamically-generated outputs within the web application output. The dynamic content marking function 306 operates generally to mark each piece of dynamically-generated content 307 being output by the web application to generate a dynamic output marking 309. The one or more marked outputs 309 are supplied to an output buffer 310 together with the static outputs 305 also generated by the web application. Of course, the number of static and dynamic outputs is variable, and there may be zero or more static outputs, and (when the disclosed technique is used) at least one or more dynamic outputs. The output buffer 310 thus stores the web application output in the form of a composite page that includes both the static outputs 305 (unmarked) and the dynamic outputs 309 (marked). Preferably, each dynamically-generated output 307 is marked to reduce the likelihood of missed sanitization.

The dynamic content marking function 306 may be implemented in one of several ways. A simple approach is to implement it as a library function that the web application 304 calls to mark and render the dynamically-generated output 307. This approach assumes that the code writer specifies which content is dynamic. The library-based approach allows easy addition of code injection protection to an existing web application. In an alternative, all content (generated by the web application in response to the request) is assumed to be dynamic so that the risk of accidentally missing content to be marked is reduced. This approach may be used with web applications that apply a model-view-controller design approach and/or with technologies such as Java Server Pages (JSP) where pure dynamic content parts are injected inside pure state content. In this alternative, the dynamic content marking function is implemented within an application container, which is modified to mark all content that is included in static context. The alternative approach should not be used when code is constructed from concatenated static and dynamic content.

Thus, the dynamic content marking function 306 may be standalone code, or code native to the web application itself.

Referring now back to FIG. 3, the static and marked dynamic (composite) output 311 is supplied to the sanitization filter 308. In general, the filter 308 is implemented conveniently as computer program code comprising special purpose computer program instructions executed by a processor. Although the filter 308 is shown as executing in the web application server 300 operating environment, as noted above, this is not a limitation. Conveniently, the filter 308 is or may be detached from the web application environment and deployed separately. The filter 308 may comprise one or more instances (distinct processes, programs, executing threads, or the like), and one or more such filters can process multiple applications at the same time. A convenient implementation of the filter 308 may be a proxy, such as the server shown in FIG. 1 using the data processing system components shown in FIG. 2. More generally, the sanitization filter may be implemented as a standalone device or other intermediary, or as a hosted (i.e. managed) service provided by a service provider. As such, the filter operates on the document output by the web application without any dependency on the technologies or input source(s) used to generate the document data.

While functions 306 and 308 preferably are decoupled, they also may be integrated. Functions 306 and 308 may also execute on a single machine or process, or in machines (or processes) that are located remotely from one another. The output buffer 310 is any data store or memory, and it may be co-located with one or both of the other functions 306 and 308, or the buffer may be accessible to one or both of the components 306 and 308 remotely. Communications among these component functions and the data store may be secure (e.g., using SSL, TLS, or the like). As already noted, there may be one or more instances of any of the system components.

In operation, the dynamically-generated content generated by the web application (in response to a given client request) is prepared for sanitization in advance by the dynamic content marking function 306. Preferably, and as will be seen, the dynamically-generated content is marked by enclosing it between dynamic content indicators. The marking is generated in such a way that it does not collide with legitimate application content and also to protect against intended collisions that attackers can try to use to bypass escaping. Then, after the document generation is completed but before it is output (delivered) to the receiver 302, the application-generated content is processed by the sanitization filter 308. The filter uses the dynamic content identifiers to identify and locate the content that needs output escaping. In general, filter 308 detects the appropriate context within which the dynamically-generated content has been placed, and it then applies the appropriate escaping. In this manner, the output content is fully prepared for escaping in advance even if it is being assembled from multiple input sources that do not operate in the same runtime environment. By decoupling the marking and filtering processes, escaping is added after all other application processing is finished and the complete document is ready for delivery to the requesting end user.

Figures 7, 8:
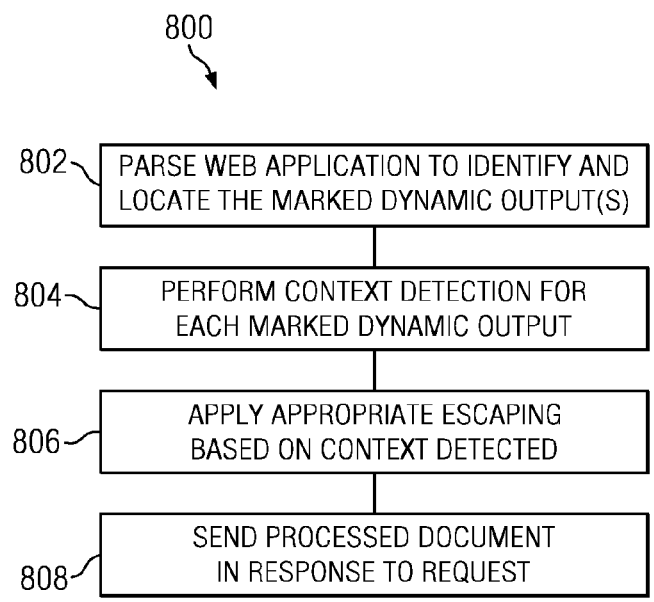
FIG. 7 illustrates the example web page markup of FIG. 6 after the sanitization filter of FIG. 3 has applied escaping for the string located between the markers positioned as shown in FIG. 6.
FIG. 8 illustrates a representative process flow describing the operation of the sanitization filter component of FIG. 3.

FIG. 8 is a process flow 800 illustrating the basic operations of the sanitization filter 308 (of FIG. 3). At step 802, the filter parses the web application to identify and locate the marked dynamic outputs. At step 804, the filter performs context detection. This detection is performed using known context detection techniques and enables the easy and simple detection of all dynamic strings (in particular, because the final document is already constructed at this point in the operation). At step 806, the filter applies escaping. The processed document is then sent to the receiver in step 808 to complete the processing.

The particular technique or mechanism for context detection (step 804) in FIG. 8 may be quite varied. There are known solutions to the problem of identifying context of each element of a completed web application document. One known approach for HTML (or XML) is to parse the document using an XML parser. Once the document is parsed, only dynamic (previously marked) content can exist inside text values. For each such value, detection of the context is then performed, for example, based on the enclosing HTML tag or attribute names. Thus, for example, enclosing tag "script" means that the text is in a script context, enclosing tag "div" means that the text is in an HTML context, enclosing the tag attribute "onclick" means that the attribute has both HTML and script contexts, etc. Also, marked content can be located inside script language source code in the script context. An example of this approach would be a simple JavaScript alert such as: "alert (Hello, BEGIN(123)ExampleTextEND(123)')". As will be described in more detail below, the strings BEGIN(123) and END(123) are markers that identify the relevant content ("ExampleText"). Context detection in this example would be implemented in a parser associated with the programming language syntax (such as JavaScript), which parser would understand that the marked output is included in string literal context and requires escaping appropriate to that context. Of course, the above examples are merely illustrative. The context detection in step 804 provides the information that is then used to position the escaping characters.

Figure 4:
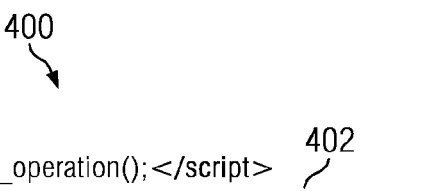
FIG. 4 is a portion of an example web page markup generated by the web application of FIG. 3 showing a JSP code snippet that includes dynamic content.
Figure 5:
FIG. 5 illustrates the example web page markup of FIG. 4 that has been modified by XSS attack to include a custom script if no sanitization is carried out according to the teachings of this disclosure.

FIGS. 4-7 illustrate the dynamic content marking and filtering process with respect to an HTML code snippet generated by the web application 304 in FIG. 3. Familiarity with basic HTML is presumed. FIG. 4 is a portion of an example web page markup generated by the web application of FIG. 3 showing a JSP code snippet 400 that includes dynamic content 402 (e.g., the user full name). This is the conventional output from the web application before any processing as contemplated by this disclosure. If no sanitization is made and the user can modify his or her name, the user can easily inject a custom script into the resulting document. This is an XSS attack. FIG. 5 illustrates the example web page markup 500 (such as shown in FIG. 4) that has been modified by XSS attack to include a custom script function 502, called hack ( ). While manual inspection of this code expose the attack easily, automatic detection of the injected script is very difficult.

Figure 6:
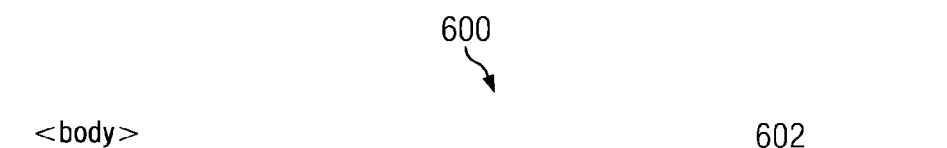
FIG. 6 illustrates the example web page markup of FIG. 5 after the dynamic content has been marked according to the teachings of this disclosure.

To address this problem, and as noted above, the disclosed technique "marks" the dynamic content in advance (i.e. after output by the web application but before delivery to the recipient). FIG. 6 illustrates the example web page markup 600 (such as shown in FIG. 5) after the dynamic content has been marked according to the teachings of this disclosure. As can be seen, the dynamic marking function puts markers 602 and 604 around the output into resulting content. For example, in one embodiment, a string (e.g., ABC123) is generated per session, and that string is used as the marker. After the dynamic marker function (<%=>) adds the marker(s), the resulting HTML appears as shown in FIG. 6. In particular, and in this example, the markers comprise a BEGIN marker 602, and an END marker 604. This nomenclature is merely representative of the approach. Each marker may have a distinct string associated therewith, and the marker may be identified in some other manner. Thus, in general, the dynamically-generated content is marked by enclosing it within two string indicators 602 and 604. Such indicators are generated so as not to collide with the legitimate application content, and also to protect against intended collisions that attackers may elect to use to (attempt to) bypass escaping. One approach is to use random or pseudo-random string values, but this is not a limitation. The random value used to indicate marking may also be included at the beginning of the document, which approach allows the sanitization filter to easily establish its value.

Another approach for generating dynamic content markers is to use a server-generated digital signature (or other encoding) of the marked content, and then using the value of that signature as the marker. In this approach, the sanitization filter (which is downstream of the marking) can verify the signature in association with the sanitization function. Private or public key signature schemes may be used for this purpose. If a private key digital signature scheme is used for marking, the dynamic content marking function (or other component) that generates the markers, as well as the sanitization filter itself, are configured with the private key, preferably upon initialization (or otherwise prior to use). If a public key digital signature scheme is used, the dynamic content marking function may use a private key to generate the markers, whereas the sanitization filter can verify the markers (i.e., the signatures) using an associated public key, which public key may be obtained from a centrally-located repository. Known public key cryptosystems may be used for this purpose. More generally, any asymmetric or symmetric key techniques may be used to generate and/or to verify markers.

Generalizing, marking the dynamically-generated output (or output portion) as described herein means associating one or more markers (or indicators) in the markup to locate and identify the dynamically-generated content.

As noted above, once the markup has been "marked" in this manner, the sanitization filter can easily (and in an automated manner) detect all dynamic strings. As noted above, because the document is already constructed at this point, the sanitization filter can identify the context and apply escaping for the string between markers. The final document snippet 700 then has the form shown in FIG. 7. This snippet includes output escaping 702.

In this manner, the disclosed technique provides runtime output sanitization that operates with content that contains multiple contexts in which dynamic output is included. The system (and, in particular, the dynamic output marking 309 and sanitization filter 308) operates to reduce the risk of injected code by marking dynamic content in advance, and then performing the output sanitization.

The technique described herein has numerous advantages. It does not rely upon any particular execution environment or any particular input source (or sources). There is no need to tag any inputs as untrusted or to have an understanding of output content as it is being generated. The basic idea is to have output content fully prepared (marked) before sanitization is performed. In this way, the final content can be assembled from multiple places, multiple servers, multiple technologies and the like but need not operate in a given runtime environment. The technique decouples the decision about the need to sanitize the content from the actual content sanitization so that the sanitization can occur after the full content is ready to be examined. By decoupling (isolating) content marking from escaping, these two operations can occur in different places, and a single escaping filter proxy can operate for the content generated from multiple execution environments (and on single content created with different environments). Further, the solution does not require any code pre-processing to add missing escaping or usage of any explicit code to make the content escaped. The approach delays escaping until the complete document is available but advantageously enables parts of the document to be generated in different environments.

Unlike known input sanitization filters, the above-described technique provides automated content sanitization that respects the context in which dynamic content is rendered. The use of the disclosed method does not require any changes in web application code and, as such, it is very easy to adopt. As mentioned above, an important advantage is that the sanitization filter can be detached from the web application and deployed separately. One or multiple filters can be used for multiple applications at the same time. As all dynamic output is marked and then sanitized, the risk of code injection vulnerability, e.g., as a result of missed sanitization, is highly reduced.

The block diagrams in the different depicted embodiments illustrate the architecture, functionality and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The disclosed subject matter can take the form of an entirely hardware embodiment, an entirely software embodiment or an embodiment containing both hardware and software elements. In a preferred embodiment, the invention is implemented in software, which includes but is not limited to firmware, resident software, microcode, etc.

The disclosed subject matter can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

In one embodiment, the program instructions are stored in a computer readable storage medium in a data processing system, and these instructions are downloaded over a network from a remote data processing system. In an alternative embodiment, the instructions are stored in a computer readable storage medium in a server data processing system, and the instructions are downloaded over a network to a remote data processing system for use in a computer readable storage medium with the remote system.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As described above, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the disclosed subject matter has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

As noted, the techniques described herein may be implemented in or in conjunction with various server-side architectures including simple n-tier architectures, web portals, federated systems, and the like.

As described above, an output processor, data store and handler mechanism that implements the disclosed techniques may be implemented as a service, or as a standalone machine, system, device, program or process.

The phrase "dynamic output" as used herein should be broadly construed to refer to any portion of a markup language document that includes dynamically-generated content, whether that output is associated with content that is visible on a page (when the page is rendered) or otherwise hidden from view.

The phrase "complete markup language document" as used herein should be broadly construed to refer to a markup language document or page that is generated by a web application after all dynamic content includes have occurred during the document generation process.

The sanitization filter may be implemented within a cloud-based operating environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

Having described our invention, what we now claim is as follows.

The invention claimed is:

1. A method, comprising:
deploying a run-time sanitization filter separately from a web application, the run-time sanitization filter being deployed to provide a sanitization function as a hosted service;
receiving, by the run-time sanitization filter, a document that has been previously generated by the web application and determined to include a full set of marked content, the full set of marked content comprising at least a first portion of dynamic output that was generated by the web application in a first context, and a second portion of dynamic output that was generated by the web application in a second context, with the second context being different than the first context;
configuring the run-time sanitization filter to identify the full set of marked content, the configuring using one or more string values included in the document;
applying the run-time sanitization filter to the first portion of dynamic output that was generated in the first context; and
applying the run-time sanitization filter to the second portion of dynamic output that was generated in the second context;
wherein deploying the run-time sanitization filter separately from the web application and receiving the document that has been previously generated by the web application and determined to include the full set of marked content decouples (i) a determination about a need to sanitize the dynamic outputs generated by the web application, and (ii) sanitization performed as the hosted service by the run-time sanitization filter, the run-time sanitization filter thereby only sanitizing the document after the full set of marked content is ready to be examined.

2. The method as described in claim 1 wherein the first context is HTML and the second context is JavaScript.

3. The method as described in claim 1 further comprising:
performing dynamic content marking by modifying application code to mark the first portion of dynamic output as being generated in the first context; and
performing dynamic content marking by modifying application code to mark the second portion of dynamic output as being generated in the second context.

4. An apparatus, comprising:
a processor;
computer memory holding computer program instructions that when executed by the processor perform operations, comprising:
deploying a run-time sanitization filter separately from a web application, the run-time sanitization filter being deployed to provide a sanitization function as a hosted service;
receiving, by the run-time sanitization filter, a document that has been previously generated by the web application and determined to include a full set of marked content, the full set of marked content comprising at least a first portion of dynamic output that was generated by the web application in a first context, and a second portion of dynamic output that was generated by the web application in a second context, with the second context being different than the first context;
configuring the run-time sanitization filter to identify the full set of marked content, the configuring using one or more string values included in the document;
applying the run-time sanitization filter to the first portion of dynamic output that was generated in the first context; and
applying the run-time sanitization filter to the second portion of dynamic output that was generated in the second context;
wherein deploying the run-time sanitization filter separately from the web application and receiving the document that has been previously generated by the web application and determined to include the full set of marked content decouples (i) a determination about a need to sanitize the dynamic outputs generated by the web application, and (ii) sanitization performed as the hosted service by the run-time sanitization filter, the run-time sanitization filter thereby only sanitizing the document after the full set of marked content is ready to be examined.

5. The apparatus as described in claim 4 wherein the first context is HTML and the second context is JavaScript.

6. The apparatus as described in claim 4 wherein the computer instructions are executed by the processor to perform further operations comprising:

performing dynamic content marking by modifying application code to mark the first portion of dynamic output as being generated in the first context; and performing dynamic content marking by modifying application code to mark the second portion of dynamic output as being generated in the second context.

7. A computer program product in a non-transitory computer readable medium for use in a data processing system, the computer program product holding computer program instructions that when executed by the data processing system perform operations, comprising:

deploying a run-time sanitization filter separately from a web application, the run-time sanitization filter being deployed to provide a sanitization function as a hosted service;

receiving, by the run-time sanitization filter, a document that has been previously generated by the web application and determined to include a full set of marked content, the full set of marked content comprising at least a first portion of dynamic output that was generated by the web application in a first context, and a second portion of dynamic output that was generated by the web application in a second context, with the second context being different than the first context;

configuring the run-time sanitization filter to identify the full set of marked content, the configuring using one or more string values included in the document;

applying the run-time sanitization filter to the first portion of dynamic output that was generated in the first context; and applying the run-time sanitization filter to the second portion of dynamic output that was generated in the second context;

wherein deploying the run-time sanitization filter separately from the web application and receiving the document that has been previously generated by the web application and determined to include the full set of marked content decouples (i) a determination about a need to sanitize the dynamic outputs generated by the web application, and (ii) sanitization performed as the hosted service by the run-time sanitization filter, the run-time sanitization filter thereby only sanitizing the document after the full set of marked content is ready to be examined.

8. The computer program product as described in claim 7 wherein the first context is HTML and the second context is JavaScript.

9. The computer program product as described in claim 7 wherein the computer instructions are executed by the processor to perform further operations comprising:

performing dynamic content marking by modifying application code to mark the first portion of dynamic output as being generated in the first context; and performing dynamic content marking by modifying application code to mark the second portion of dynamic output as being generated in the second context.

10. The method as described in claim 1 wherein the run-time sanitization filter is deployed in a cloud computing operating environment.

11. The apparatus as described in claim 4 wherein the run-time sanitization filter is deployed in a cloud computing operating environment.

12. The apparatus as described in claim 7 wherein the run-time sanitization filter is deployed in a cloud computing operating environment.

* * * * *